US008017240B2

(12) United States Patent
Strock

(10) Patent No.: US 8,017,240 B2
(45) Date of Patent: Sep. 13, 2011

(54) TERNARY CARBIDE AND NITRIDE THERMAL SPRAY ABRADABLE SEAL MATERIAL

(75) Inventor: Christopher W. Strock, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 1384 days.

(21) Appl. No.: 11/529,059

(22) Filed: Sep. 28, 2006

(65) Prior Publication Data

US 2008/0081172 A1 Apr. 3, 2008

(51) Int. Cl.
*B32B 9/00* (2006.01)

(52) U.S. Cl. .......................... 428/408; 428/565; 427/154

(58) Field of Classification Search .................. 428/698, 428/408, 701, 332
See application file for complete search history.

(56) References Cited

U.S. PATENT DOCUMENTS 5,017,402 A * 5/1991 McComas ..................... 427/446
5,314,304 A * 5/1994 Wiebe ........................ 415/173.4
5,350,557 A * 9/1994 Jarrabet et al. .................. 419/19
5,962,076 A 10/1999 Mason et al.
6,231,969 B1 5/2001 Knight et al.
2003/0211354 A1 11/2003 Subramanian et al.

FOREIGN PATENT DOCUMENTS

GB 2059806 A 4/1981
GB 2399777 A 9/2004
WO WO02/099254 A1 12/2002
WO WO2004069745 A1 8/2004

OTHER PUBLICATIONS

Z.M. Sun, A. Murugaiah, T. Zhen, A. Zhou, M.W. Barsoum: Microstructure and Mechanical Properties of Porous $TI_3SiC_2$, May 30, 2005; pp. 4359-4366.
Michael W. Barsoum and Tamer El-Raghy; The MAX Phases: Unique New Carbide & Nitride Materials: Jul. 2001; pp. 334-343.
M.W. Barsoum and M. Radovic; Mechanical Properties of the MAX Phases; 2004; pp. 1-16.
European Search Report, mailed Dec. 28, 2010.

* cited by examiner

*Primary Examiner* — David Sample
*Assistant Examiner* — Daniel H Miller
(74) *Attorney, Agent, or Firm* — Kinney & Lange, P.A.

(57) ABSTRACT

An abradable seal positioned proximate a rotating element includes a substrate having a surface facing the rotating element and a coating positioned on the surface of the substrate. The coating has a matrix material and a filler material. The matrix material constitutes between about 30 % and about 80 % of the coating by volume.

17 Claims, 1 Drawing Sheet

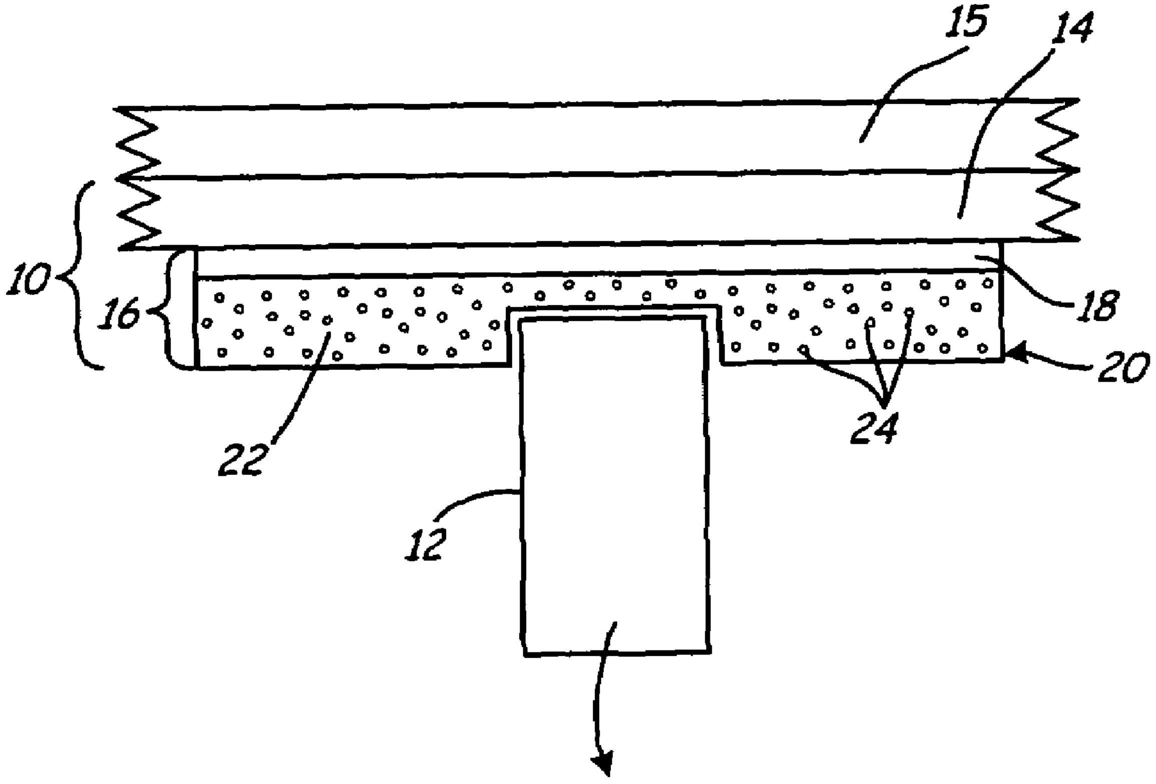
15
14
10
16
18
20
22
24
12

TERNARY CARBIDE AND NITRIDE THERMAL SPRAY ABRADABLE SEAL MATERIAL

BACKGROUND OF THE INVENTION

The present invention generally relates to the field of gas turbine engines. In particular, the present invention relates to an abradable seal for a gas turbine engine.

Abradable seals are often used in gas turbine engines to assist in reducing the operating clearances between surfaces with relative motion. For example, abradable seals may be used in gas turbine engines to help improve the efficiency of the engine and to increase its stall margin. The abradable seal is typically positioned between a stationary component opposite a rotating component. For example, the stationary component may be an outer engine casing or a shroud and the rotating component may be a blade tip, a sealing ring, a knife-edge seal, and the like. In operation, the blade initially engages the abradable seal and rubs or cuts into the abradable seal. The abradable seal helps ensure that the blade tip does not contact the outer casing, it is the abradable material of the seal that is removed, rather than the blade tip. The abradable seal thus reduces the clearance between the stationary component and the rotating component and prevents damage to components of gas turbine engines during rubs. Proper sealing between the abradable seal and the rotating component may also reduce leakages, resulting in increased efficiency and power output.

Due to the harsh environment of gas turbine engines, the engine components are preferably oxidation and corrosion resistant. The abradable seals must also be capable of withstanding the erosive environment that exists due to the entrainment of particulates in the air stream flowing through the gas turbine engine, as well as rubs from the blade tips at extremely high velocities. Because nickel alloys are oxidation and corrosion resistant, abradable seals currently used in the field are typically nickel-based and include nickel-based coatings. While the nickel alloys are successfully used in durable abradable seals, the nickel also increases the overall weight of the gas turbine engine. Another concern with using a nickel-based abradable seal is that nickel has a relatively high coefficient of thermal expansion, which may decrease the thermal cycle durability of the gas turbine engine. Consideration must also be given to the effect that the abradable material may have on downstream components of the gas turbine engine once the abradable material has been worn from the seal and is flowing through the gas turbine engine.

BRIEF SUMMARY OF THE INVENTION

An abradable seal positioned proximate a rotating element includes a substrate having a surface facing the rotating element and a coating positioned on the surface of the substrate. The coating is a matrix material and a filler material. The matrix material constitutes between about 30% and about 80% of the coating by volume.

BRIEF DESCRIPTION OF THE DRAWINGS

The sole figure is a side view of an abradable seal positioned proximate a rotating element.

DETAILED DESCRIPTION

The sole figure shows a side view of abradable seal 10 positioned proximate rotating element 12 of a gas turbine engine. Abradable seal 10 improves the efficiency and durability of the gas turbine engine by reducing the weight of the gas turbine engine and increasing the aerodynamic efficiency and stability of the gas turbine engine. This is accomplished in part by using a lower density coating and a more thermally stable coating material. In addition, abradable seal 10 has low interaction energy when abraded. The abradability of a material may be measured by the amount of energy required for rotating element 12 to wear down abradable seal 10. Abradable seal 10 also reduces damage to rotating element 12 as well as components located downstream due to its brittle fracture mode below temperatures of approximately 1200° C. by turning to dust.

Abradable seal 10 includes substrate 14 and coating 16. Substrate 14 provides a base for coating 16, which faces rotating element 12. In an exemplary embodiment, substrate 14 may be formed of metal, ceramic, or composite material. Coating 16 may be a two layer system with bond coat 18 and abradable composite layer 20. Abradable composite layer 20 is formed by a ternary carbide or nitride matrix material 22 and a filler material 24. Bond coat 18 is used only when additional adhesion is needed between substrate 14 and abradable composite layer 20.

Matrix material 22 of coating 16 may be applied as a dense single phase layer, a porous single phase layer, or a composite on substrate 14 and bond coat 18. Matrix material 22 has a layered structure at an atomic scale, and exhibits both metallic and ceramic properties, making it both durable and abradable. The performance of ternary carbide or nitride matrix material 22 is also unique in that it is independent of the purity of the ternary carbide or nitride material. Thus, some thermal decomposition and oxidation may be tolerated.

Examples of suitable matrix materials include, but are not limited to: ternary carbides and ternary nitrides. Examples of particularly suitable matrix materials include, but are not limited to: $M_2X_1Z_1$, wherein M is at least one transition metal, X is an element selected from the group consisting of: Al, Ge, Pb, Sn, Ga, P, S, In, As, Tl, and Cd, and Z is a non-metal selected from the group consisting of C and N; $M_3X_1Z_2$, wherein M is at least one transition metal, X is at least one of: Si, Al, Ge, and Z is a non-metal selected from the group consisting of C and N; and $M_4X_1Z_3$, wherein M is at least one transition metal, X is Si, and Z is N. An example of a particularly suitable metallic matrix composite is $Ti_3SiC_2$. The matrix materials listed above are disclosed and described in detail in "Microstructure and mechanical properties of porous $Ti_3SiC_2$", published online on Jul. 14, 2005, by Z. M. Sun, A. Murugaiah, T. Zhen, A. Zhou, and M. W. Barsoum; "Mechanical Properties of MAX Phases" published in 2004 by Encyclopedia of Materials Science and Technology, Eds. by Buschow, Cahn, Flemings, Kramer, Mahajan, and Veyssiere, Elsevier Science; and "The MAX Phases: Unique New Carbide and Nitride Materials", published in July-August 2001, by Michel W. Barsoum and Tamer El-Raghy.

The atomic layers within the matrix material 22 are layers of hard, strong, high modulus carbide. The atoms are also arranged in layers so that they form very weak crystallographic planes. Thus, both high modulus strong planes and very weak planes are present in matrix material 22. This results in kink bond forming tendencies, which gives it both ceramic and metallic properties. When matrix material 22 deforms, there is slip between the atomic planes of the molecules, forming kink bands. The kink bands provide toughness similar to a metal, making matrix material 22 capable of withstanding impact damage conditions while the high modulus and high hardness of the carbide layers make matrix material 22 capable of withstanding fine particle erosion. At the same time, the slip planes have low strength such that matrix material 22 is machinable using a sharp cutting point.

Filler material 24 of coating 16 acts as an inert material that may also contribute to the desired properties of coating 16. For example, filler material 24 may be used to fill pores for aerodynamics, to modify the strength or toughness of coating 16, or to modify the abradable characteristics of matrix material 22. In an exemplary embodiment, filler material 24 of coating 16 may be formed of a pore-forming material or any filler material that does not react with matrix material 22 during processing or service, including, but not limited to: ceramic material, metallic material, or glass. Examples include, but are not limited to: bentonite clay or hexagonal boron nitride. Alternatively, filler material 24 may also be a fugitive material that may be harmlessly burned out, vaporized, or leached out to leave porosity in coating 16. Examples of fugitive materials include, but are not limited to: methyl methacrylate, polyester, graphite, sodium chloride, or other organic materials.

In an exemplary embodiment, matrix material 22 preferably constitutes between approximately 30% and approximately 80% of matrix material 22 by volume. Matrix material 22 more preferably constitutes between approximately 35% and approximately 70% of matrix material 22 by volume. Matrix material 22 most preferably constitutes between approximately 40% and approximately 60% of matrix material 22 by volume.

Abradable composite layer 20 of abradable seal 10 may be applied to substrate 14 and bond coat 18 by any suitable method known in the art. Examples of suitable methods include, but are not limited to: plasma spraying, wire arc spraying, flame spraying, and high velocity oxygen fuel spraying. In an exemplary embodiment, abradable composite layer 20 is applied onto bond coat 18 of matrix material 22 to a thickness of between approximately 0.5 millimeters and approximately 5.0 millimeters. In an exemplary embodiment, matrix material 22 is applied to bond coat 18 by plasma spraying and filler material 24 is applied to bond coat 18 simultaneously by injecting it into the plasma spray plume through a separate powder injection port. In another exemplary embodiment, matrix material 22 and filler material 24 are blended to create a mixture that is fed through a single port. In another exemplary embodiment, composite powder particles containing both matrix material 22 and filler material 24 make up the feedstock.

Due to its metallic characteristics, such as toughness and ductility, abradable seal 10 may be placed in harsh environments without eroding. In an exemplary embodiment, rotating element 12 is a plurality of blade tips and abradable seal composite layer 20 is positioned on substrate 14, or outer casing 15, of a gas turbine engine proximate the blade tips. Abradable seal 10 is positioned between outer casing 15 and rotating blade tips 12 and functions to help control the clearance between outer casing 15 and blade tips 12. Outer casing 15 may serve directly as substrate 14 for coating 16, and thus be an integral part of abradable seal 10. Outer casing 15 and abradable seal 10 are stationary relative to the engine with moving blades 12. The blade tips 12 operate with a small clearance to the abradable blade outer air seal surface, and typically do not come into direct contact with abradable seal 10. However, due to thermal events such as expansion or contraction, or changing loads such as g-loads or maneuver loads, the position of outer casing 15 can occasionally shift relative to the blade tips.

While abradable seal 10 exhibits desirable metallic characteristics, abradable seal 10 also exhibits desirable ceramic characteristics. Thus, when blade tips 12 do contact abradable seal 10, damage to blade tips 12 are either minimized or prevented. Because matrix material 22 has brittle, ceramic properties, coating 16 is easily abraded from substrate 14, allowing blade tips 12 to contact with abradable seal 10 without damaging blade tips 12. This is beneficial because repairing or replacing fan blades is more costly and time-consuming than replacing abradable seal 10. In addition, due to its brittle fracture mode and low interaction energy, as abradable composite layer 20 is worn from substrate 14, the abraded material turns to dust, preventing damage to any downstream components. In addition, damage to the blade tips and casing are prevented by the low rub forces, low heat generation, and lack of coating smearing and galling. The abraded material is also environmentally friendly as it does not contain any chromium.

The abradable seal is positioned in a gas turbine engine proximate a rotating element and includes a substrate and a coating composite applied on a top surface of the substrate. The composite coating includes a ternary carbide matrix material or a ternary nitride matrix material and a filler material that does not react with the matrix material. By using the matrix material rather than a nickel-based alloy, the overall weight of the abradable seal is reduced and the thermal cycle durability of the abradable seal is increased. This is due to the low material density, low coefficient of thermal expansion, and high toughness of the composite. The abradable seal also lowers the rub forces in gas turbine engines and the clearance between the abradable seal and the rotating element, increasing the overall efficiency of the gas turbine engine. In addition, because the matrix material exhibits high impact resistance and toughness, a lower volume fraction of the matrix material is required. The matrix material of the abradable seal provides both metallic and ceramic characteristics to the abradable seal, balancing the need for erosion control and abradability. The metallic properties of the abradable seal allow for high durability to impact damage and erosion resistance. The ceramic brittle wear mechanical properties of the abradable seal allow for non-smearing, non-burr formation, and low rub forces.

Although the present invention has been described with reference to preferred embodiments, workers skilled in the art will recognize that changes may be made in form and detail without departing from the spirit and scope of the invention.

The invention claimed is:

1. In a device having a rotating element and a seal proximate the rotating element, the improvement comprising:

a substrate on the seal having a surface facing the rotating element; and a coating positioned on the surface of the substrate, wherein the coating comprises a matrix material and a filler material, and wherein the matrix material constitutes between about 40% and about 60% of the coating by volume, whereby the seal is abradable by the rotating element.

2. The seal of claim 1, wherein the filler material is a pore-forming material.

3. The seal of claim 1, wherein the coating is applied to the abradable seal by one of the group consisting of: plasma spraying, wire arc spraying, flame spraying, and high velocity oxygen fuel spraying.

4. The seal of claim 1, wherein the coating is between about 0.5 millimeters and about 5 millimeters thick.

5. The seal of claim 1, wherein the matrix material is selected from the group consisting of: a ternary carbide and a ternary nitride.

6. The seal of claim 5, wherein the matrix material comprises at least one of the group consisting of:

M2X1Z1, wherein M is at least one transition metal, X is an element selected from the group consisting of: Al, Ge, Pb, Sn, Ga, P, S, In, As, Tl, and Cd, and Z is a non-metal selected from the group consisting of C and N;

M3X1Z2, wherein M is at least one transition metal, X is at least one of: Si, Al, Ge, and Z is a non-metal selected from the group consisting of C and N; and M4X1Z3, wherein M is at least one transition metal, X is Si, and Z is N.

7. The seal of claim 6, wherein the matrix material is Ti3SiC2.

8. An abradable seal system having improved oxidation resistance and positioned for engaging a rotating element, the system comprising:

a rotating element an abradable seal having a substrate; and a coating on the substrate comprising:

a matrix material, wherein the matrix material comprises at least one of the group consisting of:

M2X1Z1, wherein M is at least one transition metal, X is an element selected from the group consisting of: Al, Ge, Pb, Sn, Ga, P, S, In, As, Tl, and Cd, and Z is a non-metal selected from the group consisting of C and N;

M3X1Z2, wherein M is at least one transition metal, X is at least one of: Si, Al, Ge, and Z is a non-metal selected from the group consisting of C and N; and M4X1Z3, wherein M is at least one transition metal, X is Si, and Z is N; and a filler material, wherein the matrix material constitutes between about 40% and about 60% of the coating by volume.

9. The abradable seal of claim 8, wherein the coating is between about 0.5 millimeters and about 5 millimeters thick.

10. The abradable seal of claim 7, wherein the coating is a dense single phase coating.

11. The abradable seal of claim 7, wherein the coating is a porous single phase coating.

12. The abradable seal of claim 7, wherein the matrix material is Ti3SiC2.

13. In combination, a rotating element of a gas turbine and an abradable seal having improved erosion resistance and abradability, the abradable seal comprising:

a rotating element of the gas turbine;

a substrate positioned to engage a rotating element of the gas turbine; and a coating positioned on the substrate, wherein the coating has a matrix material and a filler material, wherein the coating is sprayed onto the substrate, and wherein performance of the coating is independent of purity of the matrix material and wherein the matrix material constitutes between about 40% and about 60% of the coating by volume.

14. The abradeable seal of claim 13, wherein the matrix material comprises at least one of the group consisting of:

M2X1Z1, wherein M is at least one transition metal, X is an element selected from the group consisting of: Al, Ge, Pb, Sn, Ga, P, S, In, As, Tl, and Cd, and Z is a non-metal selected from the group consisting of C and N;

M3X1Z2, wherein M is at least one transition metal, X is at least one of: Si, Al, Ge, and Z is a non-metal selected from the group consisting of C and N; and M4X1Z3, wherein M is at least one transition metal, X is Si, and Z is N.

15. The abradeable seal of claim 13, wherein the matrix material is selected from the group consisting of: a ternary carbide and a ternary nitride.

16. The abradeable seal of claim 15, wherein the matrix material is Ti3SiC2.

17. The abradable seal of claim 14, wherein the coating is sprayed onto the surface by at least one of the group consisting of: wire arc spray, flame spray, plasma spray, and high velocity oxygen fuel spray.

* * * * *